UNITED STATES PATENT OFFICE.

OTTO HASSEL, OF HEIDELBERG, GERMAN EMPIRE.

IMPROVEMENT IN THE MANUFACTURE OF ARTIFICIAL FUEL.

Specification forming part of Letters Patent No. 216,613, dated June 17, 1879; application filed May 1, 1879.

*To all whom it may concern:*

Be it known that I, OTTO HASSEL, of Heidelberg, in the German Empire, have invented certain Improvements in the Manufacture of Artificial Fuel, of which the following is a specification.

This invention consists of the manufacture of artificial fuel in form of bricks or blocks out of peat, coal-dust, and other combustible materials, in combination with sea-grass, sea-weed, sea-fan, or similar vegetable substances, and in combination with a coating of pitch or other suitable substance.

The process of manufacturing is as follows: One or more of the above-named vegetable substances is or are boiled in water to a jelly, which is carefully mixed with the powdered combustible material that has to be formed into artificial fuel. The mixture is compressed in molds of suitable size into bricks, which are dried in the open air. After the bricks have sufficiently hardened the same are furnished with a coating of pitch or other suitable material, to form a strong protecting-surface against atmospherical influence.

What I claim as my invention, and desire to secure by Letters Patent, is—

In the manufacture of artificial fuel-blocks, the combination, with sea-grass, sea-weed, or other like vegetable substance, boiled to a jelly, of a combustible material, such as powdered peat or coal-dust, the whole being mixed, pressed into blocks, dried or hardened, and afterward coated with pitch, to prevent it from injury by exposure to the atmosphere, substantially as specified.

OTTO HASSEL.

Witnesses:
   GEORG ARNOLD,
   RUDOLPH SYNATZSCHKY.